United States Patent [19]

Johansen

[11] Patent Number: 4,779,295
[45] Date of Patent: Oct. 25, 1988

[54] SHOE HEEL PROTECTION DEVICE
[75] Inventor: Gerald C. Johansen, Dallas, Tex.
[73] Assignee: MVJ, Inc., Dallas, Tex.
[21] Appl. No.: 61,088
[22] Filed: Jun. 12, 1987
[51] Int. Cl.[4] ............................................. A47C 20/02
[52] U.S. Cl. .......................................... 5/431; 5/436; 5/441; 5/443
[58] Field of Search .................. 5/443, 450, 434, 436, 5/441, 442, 420, 431; 36/72 R, 72 B

[56] References Cited
U.S. PATENT DOCUMENTS

| | | | |
|---|---|---|---|
| 1,680,442 | 8/1928 | Anderson | 36/72 B |
| 2,837,145 | 6/1958 | Goetz | 5/450 |
| 2,894,339 | 7/1959 | Shapiro | 36/72 B |
| 2,988,830 | 6/1961 | Zacks | 36/72 B |
| 3,698,530 | 7/1976 | Dyson | 5/436 |

Primary Examiner—Michael F. Trettel

[57] ABSTRACT

A heel protector for use when operating vehicles comprising a pad having an envelope including at least an upper and a lower panel of flexible material sealed about their peripheral edge portions; the bottom panel being of relatively soft, high friction material; the upper panel being of relatively soft, low friction material; a layer of flexible shape-retaining material disposed within said envelope; and a layer of contour forming granular material disposed within said envelope.

8 Claims, 1 Drawing Sheet

FIG. 1
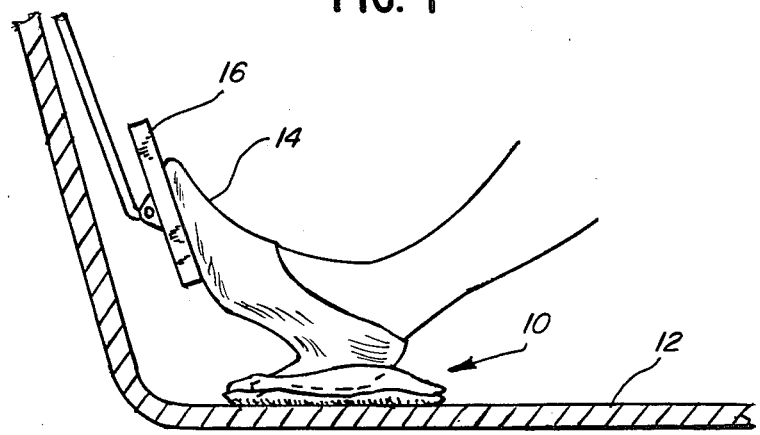
FIG. 2
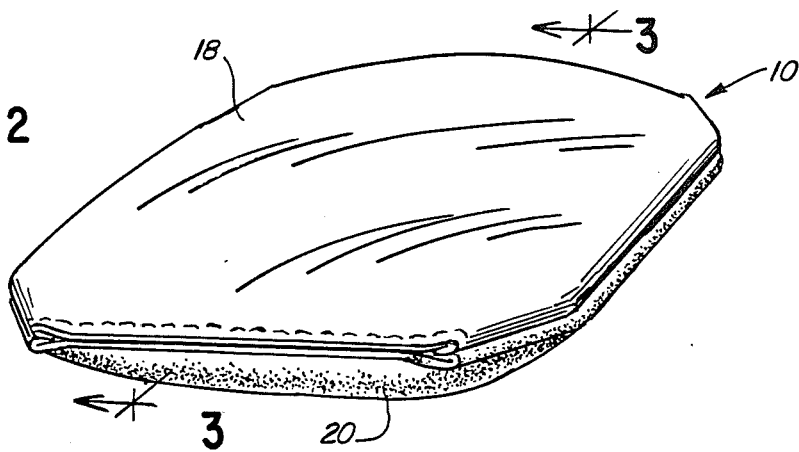
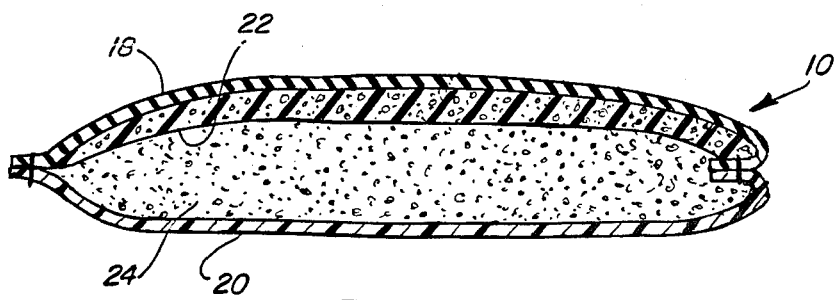
FIG. 3

SHOE HEEL PROTECTION DEVICE

The present invention concerns protective devices and, more particularly, to improvements in means for protecting the heel of shoes from scuffing when such shoes are worn when operating a vehicle.

Many such devices have been proposed. Examples thereof are disclosed in U.S. Pat. Nos. 3,851,412; 3,108,651; 3,114,272; 3,047,088; 2,444,342; 2,680,385; and 1,490,224. Notwithstanding many attempts to solve the rather mundane problem of preventing damage to expensive shoes when the individual must operate a vehicle, no satisfactory device has been developed. A satisfactory protective device must not only protect, it must be practical.

Unpatented prior art includes pad-like devices on which the heel rests. The prior art pads are unsatisfactory because they tend to slip out of place when the foot is moved between accelerator and brake. A currently available product employs "Velcro" patches which must be adhesively secured to the floor but this requirement detracts from the utility of the device. A need therefore continues to exist to a simple device which not only serves its intended purpose but is comfortable to use, is convenient, is not permanently affixed to the vehicle, is not secured to the shoe and will not move about during use.

SUMMARY OF THE INVENTION

In accordance with the invention a heel protector for use when operating vehicles comprises a pad having an envelope including at least an upper and a lower panel of flexible material sealed about their peripheral edge portions, the bottom panel being of relatively soft, high friction material, the upper panel being of relatively soft, low friction material, a layer of flexible shape-retaining material disposed within said envelope, and a layer of granular material disposed within said envelope to freely shift to thereby form a stabilized shape conforming to the heel resting on the pad.

In the preferred embodiment illustrated herein, coarse salt is used as the granular material, the shape-retaining layer being plastic foam, the lower panel being a tacky vinyl and the upper panel being glove soft vinyl.

The pad, being completely flexible, conforms to the shape of the vehicle floorboard. The tacky vinyl forming the lower panel clings to any surface on which it is placed whereby the pad will not shift or slide about. The glove soft vinyl upper panel presents a non-scuff resting surface for the heel.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same:

FIG. 1 is an elevational view illustrating a pad in accordance with the invention in use;

FIG. 2 is a perspective view of the pad; and

FIG. 3 is a sectional view taken as indicated along the line 3—3 of FIG. 2.

DETAILED DESCRIPTION

In FIG. 1 a pad 10 according to the invention is shown resting on the floorboard 12 of a vehicle in position to support the heel portion of shoe 14 when positioned to operate the accelerator 16. As shown in FIGS. 2 and 3 the pad 10 comprises an upper panel 18 and a lower panel 20 of flexible material, the panels 18, 20 being sealed together about their respective peripheral edge portions so that they define an envelope having a sealed interior cavity. The panels may be sealed by stitching or, preferably, by dielectric heating (RF sealing). A layer of shape-retaining flexible material 22 such as plastic foam is disposed within the cavity substantially coextensive with the panels 18, 20 and the remaining interior portion is substantially filled with granular material 24 such as coarse salt.

In the presently preferred form illustrated herein panel 18 comprises glove soft vinyl, panel 20 comprises tacky vinyl, shape retaining layer 22 comprises plastic foam and granular material 24 comprises coarse salt.

The tacky vinyl panel 20 preferably comprises a PVC formulation producing a sheet having a durometer of 30±2 Shore A. A suitable formulation is set forth below, as follows:

| Occidental Chemical | FPC 9275 | 100 parts |
|---|---|---|
| Exxon Chemical | Jayflex 188* | 180 parts |
| | ESC or EPO | 2.5 phr |
| | G.P. Stabilizer | 2.5 phr |
| | Omyacarb F | 30 phr |
| | Stearic Acid | 0.25 phr |
| | Pigment (Dry) | 1.6 phr |

*Jayflex 188 is a preblended plasticizer: 90% DINP and 10% 210 secondary. It can be replaced with 100% DINP or 100% DOP.

The PVC resin, FPC 9275, offers two advantages. It can absorb almost twice its weight in plasticizer while remaining dry which is important for processing purposes that utilizes a dryblend stage. Also, FPC 9275 is a very high molecular weight PVC resin which aids in improving RF sealability of the produced sheets.

Pad 10 may be of various dimensions, 6½ inch by 6½ inch by 1 inch (thickness) being typical. For such typical pad a plastic foam layer ⅜ inch thick may be satisfactorily employed.

It should be noted that the granular material 24 enables the pad to conform to the shape of the heel and thereby provide great comfort as well as support. The pad itself can be easily stowed, used (or not used) at the desire of the operator and is foolproof. As is readily apparent the pad may be formed in various shapes (e.g. rectangular to extend below both brake and accelerator).

Where salt is used as the granular material 24, the salt lends weight to the pad, adding to its stability. However, other light material may be employed with required weight producing material mixed therewith.

While preferred constructional features of the invention are embodied in the structure illustrated herein, it is to be understood that changes and variations may be made by those skilled in the art without departing from the spirit and scope of the appended claims.

What is claimed is:

1. A heel protector for use when operating vehicles comprising a pad having an envelope including at least an upper and a lower panel of flexible material sealed about their peripheral edge portions; the bottom panel being of relatively soft, high friction material; the upper panel being of relatively soft, low friction material; a layer of flexible shape-retaining material disposed within said envelope; and a layer of contour forming granular material composed of individual salt-like particles of relatively high average density disposed within said envelope.

2. A heel protector in accordance with claim 1 wherein said upper panel comprises glove soft vinyl.

3. A heel protector in accordance with claim 1 wherein said lower panel comprises a tacky vinyl.

4. A heel protector in accordance with claim 1 wherein said granular material comprises salt.

5. A heel protector in accordance with claim 1 wherein said shape retaining layer comprises plastic foam.

6. A heel protector in accordance with claim 1 wherein said upper panel comprises glove soft vinyl, said lower panel comprises tacky vinyl, said granular material comprises salt, and said shape retaining layer comprises plastic foam.

7. A heel protector for use when operating a vehicle comprising a pad-like body having a plurality of body forming discrete layers of deformable material, a first outer one of said layers having an exterior surface of non-abrasive characteristic for supporting said heel, a second outer one of said layers having an exterior surface of soft rubbery characteristic for non-slip engagement with surface structure of said vehicle, and at least one interior layer, said one interior layer composed of individual particles of relatively high average density salt-like material.

8. A heel protector in accordance with claim 7 and further including a second interior layer of flexible high memory material for maintaining the shape of said body irrespective of shifting of said particles.

* * * * *